UNITED STATES PATENT OFFICE.

HATTIE C. WRIGHT, OF SHUMANSVILLE, VIRGINIA.

CLEANING COMPOUND.

No. 881,989.

Specification of Letters Patent.

Patented March 17, 1908.

Application filed June 13, 1907. Serial No. 378,873.

To all whom it may concern:

Be it known that I, HATTIE C. WRIGHT, a citizen of the United States, residing at Shumansville, in the county of Caroline and State of Virginia, have invented a new and useful Improvement in a Compound, of which the following is a specification.

The object of this invention is a scouring powder especially adapted for household use and of an inexpensive nature.

It is designed for cleaning wood, wooden ware and metals both common and rare. In preparing this compound I use ten quarts of water, two and one-half pounds of any good laundry soap, or a powdered soap such as pearline, one pound of bi-carbonate of soda, eight ounces of borax, five ounces of spirits of turpentine, twelve quarts of wheat flour, two ounces of gold bronze, two ounces of silver bronze, twenty-eight quarts of ashes secured from smoldered pine chips, and five ounces of tartaric acid.

In manufacturing the compound the water is brought to the boiling point and the soap, borax, spirits of turpentine and tartaric acid are placed in the boiling water and stirred until the whole is in liquid form. If the laundry soap employed is in the form of cakes it is cut or sliced into small pieces before adding the boiling water. To this liquid is then added the twenty-eight quarts of ashes and the resultant damp paste is placed into pans and dried by hot air.

When cool, the flour, soda, gold and silver bronze are added to the ash powder and the whole passed through a revolving sifter after it is placed in suitable boxes ready for use.

If it is not desired to employ both the silver and gold bronze, four ounces of either may be substituted for the two ounces above specified of each.

In applying to wooden articles they are first washed and then the powder applied to them dry and they are given a slight rubbing with the cloth by means of which the powder was applied.

For metals, especially gold, silver and nickel the powder is applied dry by means of a piece of soft fabric, and if the first application does not remove the stains they are slightly dampened and then finished with a second application of the dry powder.

The powder will not only remove dirt and stains but also imparts a very durable polish to such metals as gold, silver and nickel.

Having thus fully described my invention, what I claim as new and desire to secure by Letters Patent, is:—

1. A cleaning compound of the kind described consisting of a powder form of ashes, bi-carbonate of soda, tartaric acid, borax, spirits of turpentine, flour, silver bronze powder and soap.

2. A compound of the kind described consisting of a finely comminuted powder composed of the following ingredients in the proportion named, that is: two and one-half pounds of laundry soap, one pound of bi-carbonate of soda, eight ounces of borax five ounces of tartaric acid, twenty-eight quarts of fine ashes twelve quarts of wheat flour and four ounces of bronze powder, the said powder having incorporated therein two ounces of spirits of turpentine.

HATTIE C. WRIGHT.

Witnesses:
W. E. ENNIS,
DAVIS B. POWER, Jr.